Dec. 2, 1924.

A. C. HANSON 1,517,423

CLUTCH JACK

Filed Aug. 12, 1922    2 Sheets-Sheet 1

Inventor
A.C. Hanson.

By William J. Jacoby
Attorney

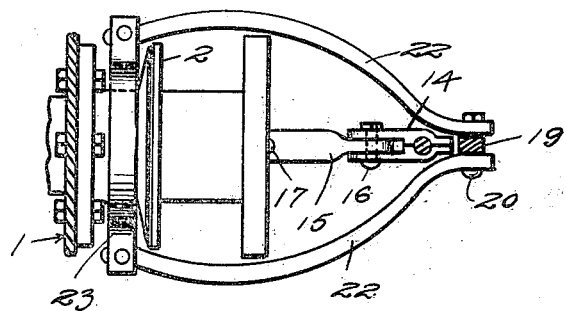
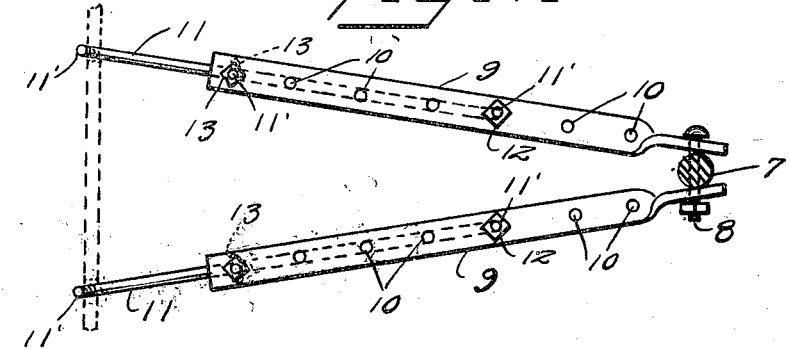
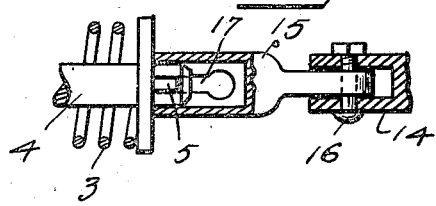
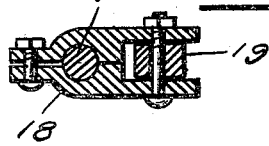

Patented Dec. 2, 1924.

1,517,423

UNITED STATES PATENT OFFICE.

ARTHUR C. HANSON, OF DALLAS, SOUTH DAKOTA.

CLUTCH JACK.

Application filed August 12, 1922. Serial No. 581,473.

*To all whom it may concern:*

Be it known that ARTHUR C. HANSON, a citizen of the United States, residing at Dallas, in the county of Gregory and State of South Dakota, has invented certain new and useful Improvements in Clutch Jacks, of which the following is a specification.

This invention relates to the novel construction of a garage tool and aims to provide a tool that is particularly adapted to remove the clutch on the well known Chevrolet automobile.

In removing the clutch of a Chevrolet automobile for the purpose of repairing or replacing with new parts, considerable difficulty is experienced by the mechanic due to the fact that the clutch is mounted on a clutch spring tension rod and a clutch spring is positioned on the tension rod by a retaining pin, and it is necessary to release the pressure on the retaining pin to release same from the tension rod before the clutch can be removed, which has heretofore proved to be a very difficult job, and my invention has been primarily designed to eliminate the trouble experienced in removing this retaining pin, so that the clutch may be readily removed.

A further object of the invention is to provide a tool of the above stated character, with slight modifications that can be readily used for the purpose of removing pulleys, gears, etc. from shafts of all kinds.

A still further object of the invention is to provide a tool of the above stated character, which is simple in construction and operation, efficient for the purpose intended, durable, and one that can be manufactured and placed on the market at a relatively low cost.

These and like objects of the invention will be better understood as the description follows and as is specifically pointed out in the appended claims.

Referring to the accompanying drawing, which forms a part of this specification and which clearly illustrates the construction of my invention.

Figure 3 is a horizontal section as seen on the line 3—3 of Fig. 1.

Figure 4 is a transverse section as seen on the line 4—4 of Fig. 1.

Figure 5 is a horizontal section as seen on the line 5—5 of Fig. 1, and

Figure 6 is a transverse section as seen on the line 6—6 of Fig. 1.

Like numerals will be used to designate like parts in the different views.

Figure 1:
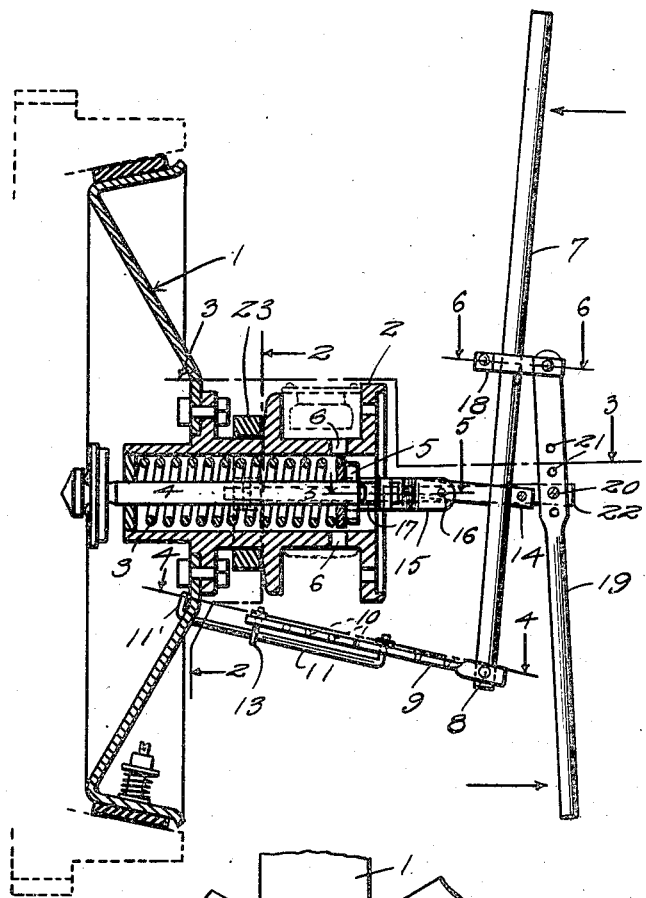
Figure 1 is the side elevation of my invention, applied to a clutch.
Figure 2:
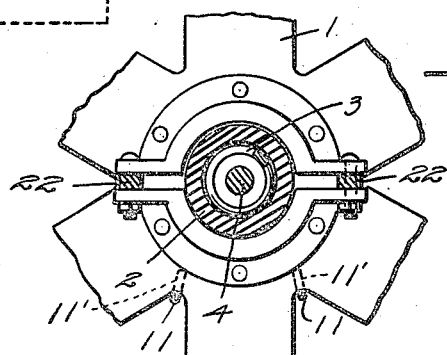
Figure 2 is a vertical section as seen on the line 2—2 of Fig. 1.

In the drawing, the numeral 1 indicates a clutch of an automobile, 2 the clutch collar, 3 the clutch tension spring which is mounted on the tension rod 4, and 5 is the clutch spring retaining pin, mounted in the end of the tension rod 4. In order to remove the clutch, it is necessary to bring the clutch spring retaining pin 5 into alinement with the openings 6 formed in the clutch collar, and my invention has been designed primarily for this purpose.

My invention employs a lever 7, which can be of any shape and formed of any suitable material. Pivoted to the lever 7 on a bolt 8 adjacent the lower end of the lever is a pair of arms 9, each of which is provided throughout its entire length with a series of apertures extending therethrough, as indicated by the numeral 10. The clutch engaging rod 11, which has both ends curved upwardly as indicated by the numeral 11′ and one of the ends provided with screw threads so that after the end of the clutch collar rod having the screw threads thereon has been inserted through one of the apertures 10, a nut 12 or other fastening means may be screwed thereon for the purpose of locking the said rod in engagement with the pivoted arms 9. Each of the arms 9 is provided adjacent the outer end of same with a guide member 13, for the clutch collar rod 11. The upwardly curved portion on the outer end of each of the rods 11 provides means for engagement with the clutch or collar of same, the purpose of which will be better understood as the description proceeds. A clamp 14 is slidable on the lever 7 and has a clutch spring engaging member 15 pivoted to the clamp 14 as indicated by the numeral 16. The member 15 has the free end of same bifurcated as indicated by the numeral 17, to permit the said member to pass over the tension rod and retaining pin, thus allowing the free end of same to engage the outer end of the clutch spring.

On the retaining pin operating lever 7 at a point above the clamp 14, is a second clamp 18, which has pivotally connected thereto a clutch collar operating lever 19, pivoted as at 20. The clutch collar lever is provided with a series of apertures 21 extending therethrough, to provide means for pivotally connecting on the opposite side of the lever 19 clutch collar arms 22, which are connected at their outer ends by means of a clutch collar clamp 23.

After a clutch has been in use for some time, the clutch leather wears, which causes the clutch to extend further in the fly wheels than intended, which causes the openings 6 in the clutch collar to move out of alinement with the retaining pin 5, and the operation of my invention for the purpose of bringing the opening 6 into alinement with the retaining pin to remove same, and also the clutch is as follows.

The rods 11 are connected with the clutch by means of the upwardly curved ends, and the bifurcated end of the clutch spring engaging member 15, is placed over the end of the tension rod and retaining pin, and upon movement of the lever 7 in the direction of the clutch, the bifurcated end of the member 15 engages the clutch spring and relieves the tension of same against the retaining pin, and then the clutch collar operating lever 19 is moved in the direction away from the clutch, which causes the clutch collar having the openings 6 therein to move outwardly thus bringing the openings 6 into alinement with the retaining pin, after which a tool of any kind can be used for driving the retaining pin out of position, after which it is easy to disassemble the clutch.

In view of the foregoing description of my invention taken in connection with the accompanying drawing, it is thought that any further explanation as to the operation and construction of same is unnecessary.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new and desire to secure by Letters Patent is:—

1. In a device of the above stated character, comprising a retaining pin operating lever, clutch engaging members pivotally connected to said lever, means slidable on said lever for engagement with a clutch spring and retaining pin, and a clutch collar operating lever slidably mounted on the retaining pin operating lever.

2. In a device of the above stated character, comprising a clutch spring and retaining pin operating lever, clutch engaging members pivotally connected to said lever, a clutch spring and retaining pin member adjustably positioned on said lever for engagement with said clutch spring and retaining pin, a clutch collar lever adjustably positioned on said clutch spring and retaining pin lever and means for connecting said clutch lever with a clutch collar.

3. In a device of the above stated character, comprising clutch springs and retaining pin lever, arms pivotally connected to one end of said lever, means adjustably connected to said lever for engagement with a clutch, a clutch spring and clutch pin engaging member adjustably positioned on said lever, a clutch collar lever adjustably positioned on said clutch spring and retaining pin lever and means pivotally connected to said clutch collar lever for engagement with the clutch.

In testimony whereof I affix my signature.

ARTHUR C. HANSON.